US007747171B1

(12) United States Patent
Hansen et al.

(10) Patent No.: US 7,747,171 B1
(45) Date of Patent: Jun. 29, 2010

(54) METHOD AND APPARATUS FOR ALLEVIATING SLOPE-INDUCED IMPAIRMENTS TO CHIRPED OPTICAL SIGNALS PROPAGATING IN AN OPTICAL TRANSMISSION SYSTEM

(75) Inventors: Per Bang Hansen, Rumson, NJ (US); Torben N. Nielsen, Monmouth Beach, NJ (US); Lars Erik Eskildsen, Holmdel, NJ (US)

(73) Assignee: Meriton Networks US Inc., Wilmington, DE (US)

( * ) Notice: Subject to any disclaimer, the term of this patent is extended or adjusted under 35 U.S.C. 154(b) by 1607 days.

(21) Appl. No.: 10/238,985

(22) Filed: Sep. 10, 2002

(51) Int. Cl.
*H04B 10/00* (2006.01)
(52) U.S. Cl. .................. 398/147; 398/192; 398/194
(58) Field of Classification Search ......... 398/158–161, 398/173–181, 182–201, 147–150
See application file for complete search history.

(56) References Cited

U.S. PATENT DOCUMENTS

| 4,805,235 | A | * | 2/1989 | Henmi | 398/195 |
| 5,073,331 | A | | 12/1991 | Shirasaki | 372/26 |
| 5,416,629 | A | * | 5/1995 | Huber | 398/187 |
| 5,524,144 | A | | 6/1996 | Suzuki | 359/176 |
| 5,774,485 | A | | 6/1998 | Stein | 372/20 |
| 5,974,209 | A | * | 10/1999 | Cho et al. | 385/28 |
| 6,104,851 | A | * | 8/2000 | Mahgerefteh | 385/37 |
| 6,115,403 | A | * | 9/2000 | Brenner et al. | 372/102 |
| 6,331,991 | B1 | * | 12/2001 | Mahgerefteh | 372/33 |
| 6,370,170 | B1 | * | 4/2002 | Glance | 372/32 |
| 6,404,964 | B1 | * | 6/2002 | Bhagavatula et al. | 385/123 |
| 6,430,346 | B1 | * | 8/2002 | Conradi et al. | 385/123 |
| 6,912,362 | B1 | * | 6/2005 | Takiguchi et al. | 398/158 |
| 6,925,262 | B2 | * | 8/2005 | Ooi et al. | 398/147 |
| 6,961,522 | B1 | * | 11/2005 | Castagnetti et al. | 398/92 |
| 6,963,685 | B2 | * | 11/2005 | Mahgerefteh et al. | 385/37 |
| 7,020,398 | B2 | * | 3/2006 | Takiguchi et al. | 398/158 |
| 7,116,908 | B2 | * | 10/2006 | Uda et al. | 398/94 |
| 7,194,210 | B2 | * | 3/2007 | Uda et al. | 398/159 |
| 7,200,296 | B2 | * | 4/2007 | Kish et al. | 385/14 |
| 2002/0131160 | A1 | * | 9/2002 | McNicol | 359/337.5 |
| 2004/0028319 | A1 | * | 2/2004 | Ajgaonkar et al. | 385/16 |

OTHER PUBLICATIONS

U.S. Appl. No. 09/571,833, filed May 16, 2000, Wagener et al.
U.S. Appl. No. 09/691,812, filed Oct. 19, 2000, Wagener et al.

* cited by examiner

*Primary Examiner*—Agustin Bello
(74) *Attorney, Agent, or Firm*—Mayer & Williams PC; Stuart H. Mayer, Esq.; Karin L. Williams, Esq.

(57) ABSTRACT

A method and apparatus is provided for reducing impairment to an adiabatically chirped optical signal propagating in an optical communication system. The method begins by receiving an adiabatically chirped optical signal that has traversed one or more network components in the optical communication system. The optical signal has a parameter characteristic of signal quality (e.g., an extinction ratio) that is reduced at least in part by a fidelity-degrading transmission slope accumulated in the one or more network components. A fidelity-enhancing transmission slope imparted to at least one wavelength of the adiabatically chirped optical signal at one or more select points along a transmission path of the communication system so that the optical signal experiences an increase in said parameter characteristic of signal quality.

28 Claims, 4 Drawing Sheets

METHOD AND APPARATUS FOR ALLEVIATING SLOPE-INDUCED IMPAIRMENTS TO CHIRPED OPTICAL SIGNALS PROPAGATING IN AN OPTICAL TRANSMISSION SYSTEM

FIELD OF THE INVENTION

The present invention relates generally to WDM optical communication systems, and more particularly to a method and apparatus for providing a directly modulated optical signal that has a spectrally broadened adiabatic chirp that better maintains its fidelity as it propagates through an optical communication system.

BACKGROUND OF THE INVENTION

Optical communication systems are a substantial and fast growing constituent of communication networks. Wavelength division multiplexing (WDM) is one technique used to increase the capacity of optical transmission systems. A wavelength division multiplexed optical transmission system employs plural optical channels, each channel being assigned a particular channel wavelength. In a WDM system, optical channels are generated, multiplexed to form an optical signal comprised of the individual optical channels, transmitted over a waveguide, and demultiplexed such that each channel wavelength is individually routed to a designated receiver.

WDM systems have been deployed in long distance networks in a point-to-point configuration consisting of end terminals spaced from each other by one or more segments of optical fiber. In metropolitan areas, however, WDM systems having a ring or loop configuration are currently being developed. Such systems typically include a plurality of nodes located along the ring. Each node consists of one or more optical components and may include means for adding and/or dropping one or more signals. Nodes that do not allow adding or dropping of signals are typically referred to as in-line amplifiers or optical regenerators. A particular node that allows the addition and extraction of all the channels is commonly referred to as a hub or central office node, and typically has a plurality of associated add/drop elements for transmitting and receiving a corresponding plurality of channels to/from other nodes along the ring.

In a typical WDM optical communication system, information bearing optical signals corresponding to each channel is transmitted along an optical fiber by modulating light from a laser. Modulation methods are basically divided into two types: those for directly modulating a driving current of a laser using transmission data, namely, direct modulation methods, and those for modulating the output light from the laser using an external modulator such as a Mach-Zehnder interferometer, namely, external modulation methods. Although external modulation schemes effectively encode the optical signals with communication data, the external modulator is expensive and inserts additional loss into the system. Such loss, however, can be compensated in long haul networks with optical amplifiers, which further add to the cost of the system.

Shorter haul networks such as metropolitan ring networks, however, are more cost sensitive than long haul networks. Accordingly, in order to reduce the cost of these networks, semiconductor distributed feedback (DFB) directly modulated lasers have been proposed. These lasers are turned on and off directly in accordance with the communication data, thereby eliminating the need for an external modulator. For example, a commonly used prior-art direct modulation system uses the threshold current $I_T$ of a semiconductor laser as a bias current, and superimposes on the bias current a modulation current which is responsive to transmission data, thereby driving the semiconductor laser. In such modulation methods, however, the semiconductor laser must be driven by a pulse current with relatively large amplitude. This produces chirping (i.e., a dynamic wavelength shift) relative to a nominal wavelength distorting the waveform of the optical pulse propagating in dispersive optical fibers.

To decrease such chirping, a constant bias current $I_O$, which is larger by a sufficient margin than the threshold current $I_T$ of the laser, is sometimes applied to the modulating current $I_m$, which is typically several tens of milliamperes. Thus, modulation is performed using only that current region which is larger than the threshold current $F_r$ of the laser. One problem with this approach is that even when a data bit of "0" is transmitted, a light emission state is maintained, thereby deteriorating the light extinction ratio of the output light.

Regardless of the particular manner in which the bias current is applied to the laser, the optical spectrum of a directly modulated semiconductor laser will be chirped in the manner shown in FIG. 1. As shown, the signal has a main intensity peak 101 at the intended channel wavelength and is spectrally broadened to include a subsidiary peak 102 at chirp-induced wavelength higher than the channel wavelength. Main peak 101 corresponds to a data bit of "1" and subsidiary peak 102 corresponds to a data bit of "0." While the wavelength excursion between the main peak 101 and the subsidiary peak 102 can vary considerably, 0.1 nm may serve as a typical value. The wavelength excursion originating from the direct modulation of the laser includes a transient chirp term and an adiabatic chirp term. The wavelength separation between the main peak 101 and the subsidiary peak 102 depicted in FIG. 1 arises primarily from the adiabatic chirp term, which is caused by the wavelength dependency of the laser output on the modulation current that is applied to the laser for controlling the laser output's intensity.

Adiabatic, as well as transient chirp, limit the distance over which the signal can be transmitted in a dispersive fiber without experiencing an unacceptable degree of degradation. High data transmission rates as well as high-dispersion fibers such as conventional single-mode fiber exacerbate the performance degradation caused by transient chirp. While the degradation caused by the transient chirp can be reduced by well-known techniques such as dispersion compensation, the fidelity of the signal may still be deteriorated due to the adiabatic chirp. This arises when optical filters are present in the network that introduce higher loss for the main peak 101 compared to the subsidiary peak 102, which in effect reduces the fidelity of the signal.

Accordingly, it would be advantageous to provide a method and apparatus for providing a directly modulated optical signal that has a spectrally broadened adiabatic chirp that better maintains its fidelity as it propagates through an optical communication system.

SUMMARY OF THE INVENTION

The present invention provides a method for reducing impairment to an adiabatically chirped optical signal propagating in an optical communication system. The method begins by receiving an adiabatically chirped optical signal that has traversed one or more network components in the optical communication system. The optical signal has a parameter characteristic of signal quality that is reduced at least in part by a fidelity-degrading transmission slope accumulated in the one or more network components. A fidelity-enhancing transmission slope imparted to at least one wavelength of the adiabatically chirped optical signal at one or more select points along a transmission path of the communication system so that the optical signal experiences an increase in said parameter characteristic of signal quality.

In accordance with one aspect of the invention, the parameter characteristic of signal quality is an extinction ratio.

In accordance with another aspect of the invention, the fidelity-enhancing transmission slope is at least substantially equal in magnitude to the total fidelity-degrading transmission slope.

In accordance with another aspect of the invention, the fidelity-enhancing transmission slope offsets the total fidelity-degrading transmission slope by a prescribed amount. In some embodiments of the invention the prescribed amount is selected so that a non-adiabatically chirped signal traversing the one or more network components experiences a transmission penalty below a predetermined value.

In accordance with another aspect of the invention, a WDM optical communication system is provided that includes a plurality of network components each having a characteristic transmission profile with an individual transmission slope experienced by an optical signal propagating therethrough. At least one of the network components includes an optical switch and at least one optical communication link interconnects the network components. At least one filter element having a fidelity-enhancing transmission slope is provided to at least partially offset a total fidelity-degrading transmission slope experienced by the optical signal. The total fidelity-degrading transmission slope is an accumulation of the individual transmission slopes of the network components.

DETAILED DESCRIPTION

Figure 2:
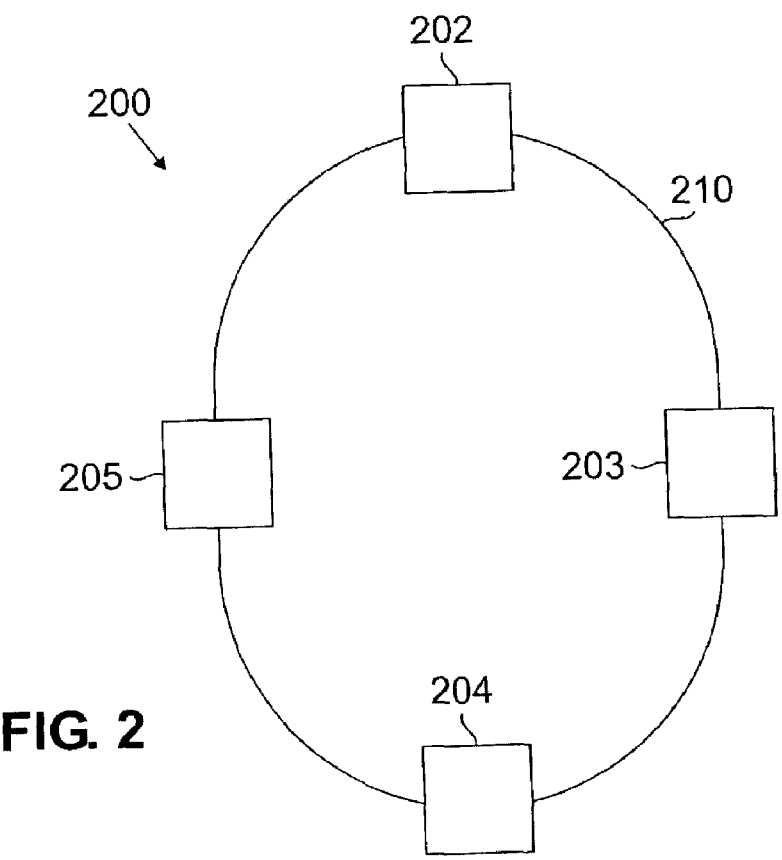
FIG. 2 shows a functional block diagram of an exemplary WDM ring network 200 in which the present invention may be employed.

FIG. 2 shows a functional block diagram of an exemplary WDM ring network 200 in which the present invention may be employed. Ring network 200 includes a plurality of nodes 202-205 connected along a continuous, or looped, optical path 210. Each of these nodes is typically linked by a segment of optical fiber. One or more optical amplifiers (not shown) also may be employed. While the optical amplifiers may be distinct elements located along the optical path 210, when employed they are more typically an integral part of the nodes. Nodes 202-205 also may include an optical switch such as an optical crossconnect or an optical add/drop multiplexer (OADM), user interfaces, and a network management element. The optical switches may be static switches in which particular wavelengths received on optical path 210 can only be received by predetermined ones of the local ports of the nodes. Alternatively, one or more of the optical switches may be reconfigurable optical switches in which any wavelength channel can be selectively dropped to any local port of the nodes. Such reconfigurable optical switches may be electro-optical elements, which relies on conversion of the signal to the electrical domain for the actual switching, or, more preferably, all-optical elements. Examples of an all-optical reconfigurable switch are disclosed in U.S. patent application Ser. Nos. 09/571,833 and 09/691,812, which are hereby incorporated by reference in their entirety. It is understood that combiners, couplers, star distribution networks, signal regenerators, reconditioners, add/drop multiplexers, repeaters, additional switching elements and optical amplifiers, and the like may be present in the optical communication system and coupled to the optical communication path without any loss of generality of applicability for the principles of the present invention. Moreover, those of ordinary skill in the art will recognize that the present invention is equally applicable to other network topologies in addition to rings such as mesh or point-to-point topologies, for example.

One measure of the fidelity of an optical signal traversing a communication network such as shown in FIG. 2 is its extinction ratio, which is the ratio of signal power in the on-state to the signal power in the off-state. As the optical signal traverses the various components of the communication system, its extinction ratio may increase or decrease, depending on the characteristics of the individual components. Some characteristics tend to improve signal quality; others tend to degrade signal quality.

Figure 1:
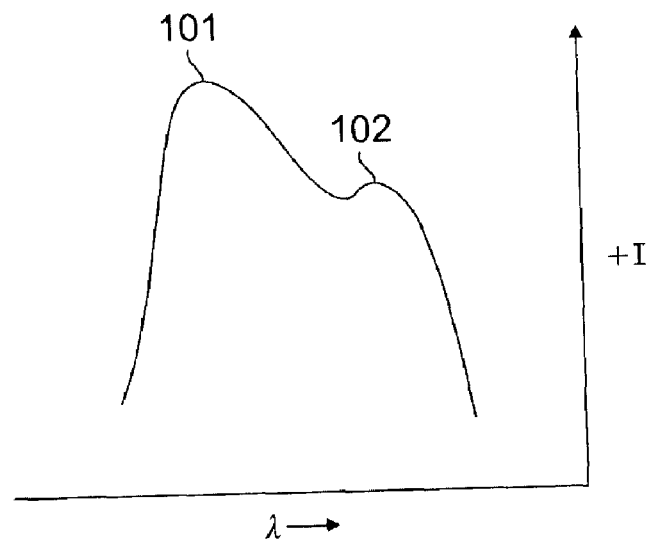
FIG. 1 shows the optical spectrum of a directly modulated semiconductor laser.
Figure 3:
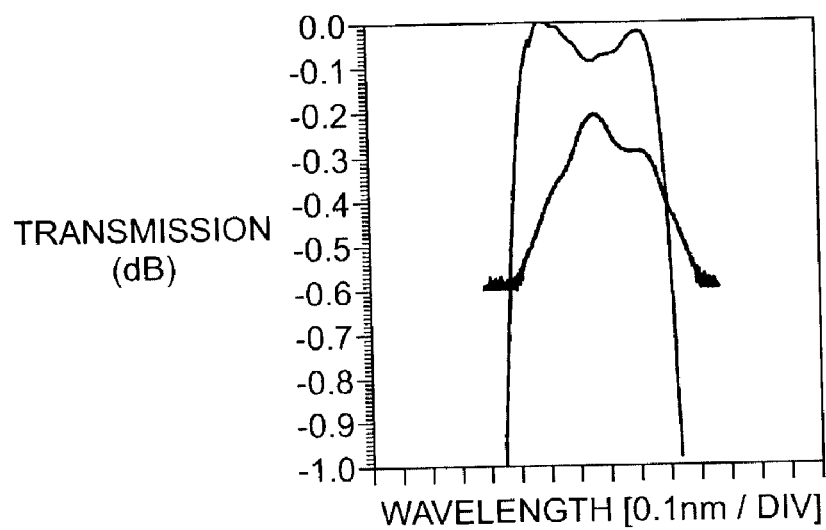
FIG. 3 shows an example of the transmission response of an optical bandpass filter over the wavelength range of the spectrally broadened, directly modulated signal.

FIG. 3 shows an example of the transmission response of an optical bandpass filter over the wavelength range of the spectrally broadened, directly modulated signal. However, the discussion applies to any network component (e.g., a node, switch, multiplexer, optical amplifier, or any of the other aforementioned components discussed in connection with FIG. 1) The directly modulated optical signal from FIG. 1 is superimposed on FIG. 3. The extinction ratio of the signal after traversing this particular component decreases since the component's transmission response has a local minimum that is spectrally aligned with the main peak of the signal and a local maximum that is spectrally aligned with the subsidiary peak of the signal. Consequently, the fidelity of the signal is reduced as results of passing through the component.

Figure 4:
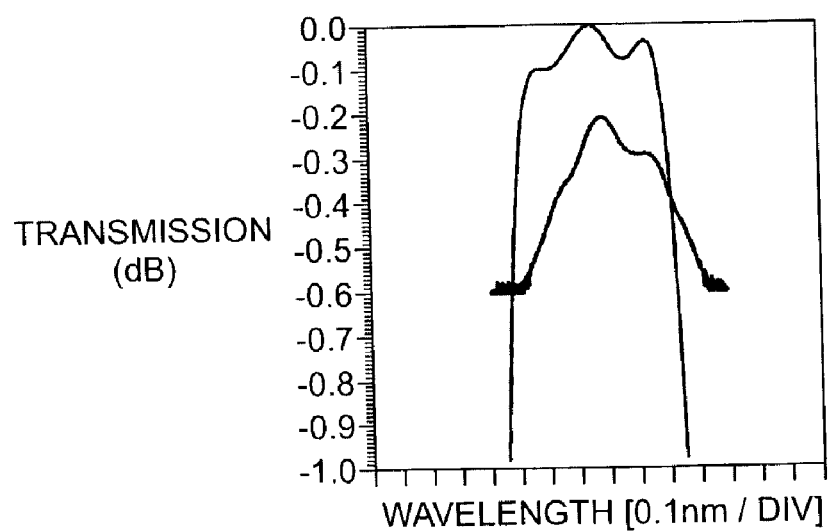
FIG. 4 shows another example of the transmission response of a network component over the wavelength range of the spectrally broadened, directly modulated signal.

FIG. 4 shows another example of the transmission response of a network component over the wavelength range of the spectrally broadened, directly modulated signal. In this case the transmission response of the component causes an increase in the extinction ratio of the signal. That is, the component's transmission response has a local maximum that is spectrally aligned with the main peak of the signal and a local minimum that is spectrally aligned with the subsidiary peak of the signal. The net effect is therefore an increase in the extinction ration of the signal and an improvement of the transmission performance.

It is to be understood that the term "transmission slope," or simply "slope," as used herein defines the relationship between the transmission response of a network component at the wavelength corresponding to the signal's main peak to the transmission response at the wavelength corresponding to the signal's subsidiary peak. In particular, a fidelity-degrading slope refers to a relationship between the transmission response at the two wavelengths, where the transmission is higher at the wavelength corresponding to the subsidiary peak. For a typical adiabatically chirped laser source a fidelity-degrading slope causes the extinction ratio of the signal to decrease. That is, the transmission response shown in FIG. 3 has a fidelity-degrading slope with respect to the particular optical signal superimposed on FIG. 3. On the other hand, a fidelity-enhancing slope causes the extinction ratio of a typical adiabatically chirped signal to increase, improving the transmission performance. That is, the transmission response shown in FIG. 4 has a fidelity-enhancing slope with respect to the optical signal superimposed on the FIG. 4. It is important to note that the slope of the component's transmission response does not refer to any particular shape of the component's transmission profile. Rather, in more general terms, the slope denotes a characteristic of the transmission response as it impacts on a parameter characteristic of signal quality such as the extinction ratio of the optical signal.

Figure 7:
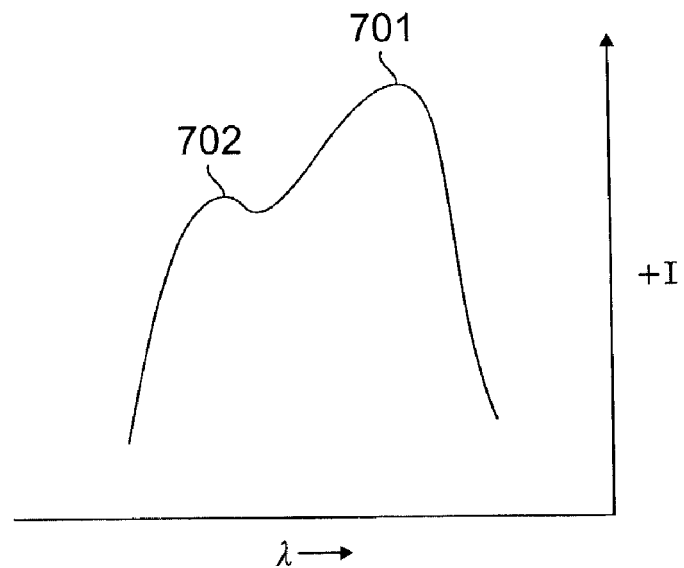
FIG. 7 shows the optical spectrum of a directly modulated semiconductor laser similar to that depicted in FIG. 1 except that in contrast to FIG. 1, the main peak is located at a longer wavelength than the subsidiary peak.

It should be noted that the terms "fidelity-degrading transmission slope" and "fidelity-enhancing transmission slope" as used herein is equally applicable when the directly modulated laser output is chirped in the manner shown in FIG. 7. In contrast to the chirp depicted in FIG. 1, in FIG. 7 the main peak 701 is located at a longer wavelength than the subsidiary peak 702. In this case the transmission response shown in FIG. 3 has a fidelity-enhancing slope with respect to the optical signal of FIG. 7. Likewise, the transmission response shown in FIG. 4 has a fidelity-degrading slope with respect to the optical signal of FIG. 7. This is consistent with the aforementioned statement that the transmission slope denotes a characteristic of the transmission response as it impacts on a parameter characteristic of signal quality such as the extinction ratio of the optical signal.

As an optical signal traverses multiple components in a communication network its extinction ratio increases or decreases as a result of the cumulative effects of the transmission slope of each component. To maintain the fidelity of the optical signal, the present invention reduces or even eliminates the amount of total fidelity-degrading transmission slope that is experienced by a signal propagating in the network. In particular, a filter element with a fidelity-enhancing transmission slope is added at various points in the network to at least partially offset the value of the total fidelity-degrading slope that has accumulated. Alternatively, instead of adding an additional filter element, the transmission characteristics of one or more of the network components already present in the network, which serve other functions, may be modified to add the desired fidelity-enhancing slope.

The fidelity-enhancing transmission slope may be added in a discrete or distributed manner, the selection of which will generally depend on the nature of the network. In a discrete arrangement a small number (or even one) of filter elements with a large or steep slope are incorporated into the network. Alternatively, in a distributed arrangement, a greater number of filter elements with relatively smaller slopes may be distributed throughout the network, which can be particularly advantageous in a reconfigurable network in which different optical signals traverse different and an ever-changing number of components. Since in this case the transmission slope of the additional filter elements is small, their insertion loss is typically also small, and thus the adverse effect on the overall noise performance can be kept to a minimum.

In a discrete arrangement the filter elements may be inserted at the transmitter or receiver if a sufficient power budget is available. Other network locations at which a single, large slope filter element may be advantageously added are those where its insertion loss will have little or no negative impact on system performance. Ideally, the accumulated fidelity-enhancing slope experienced by the signal will be equal to or larger than (in magnitude) the original accumulated transmission slope that would otherwise be experienced by the signal without the addition of a fidelity-enhancing slope. However, smaller amounts of accumulated fidelity-enhancing slope will also provide some degree of improvement.

Figure 5A:
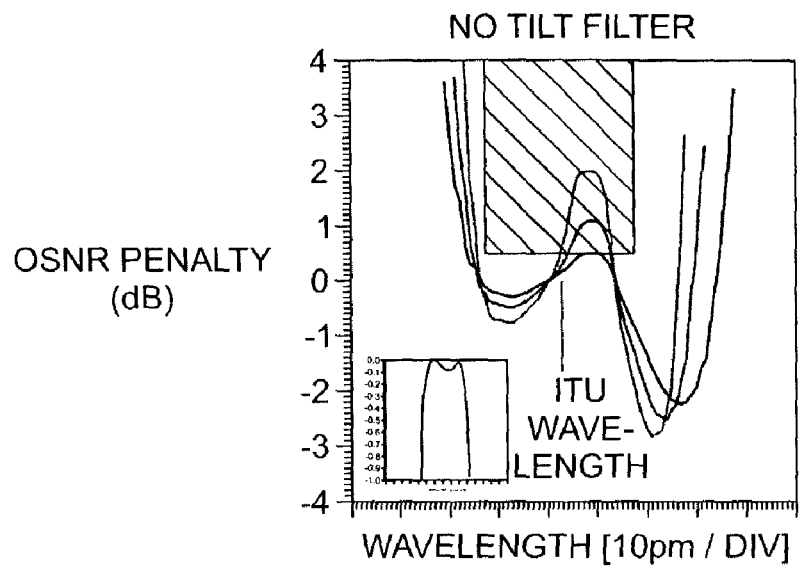
FIGS. 5(a) and 5(b) show the results of a calculation comparing the transmission penalty with and without the provision of a fidelity-enhancing transmission slope.
Figure 5B:
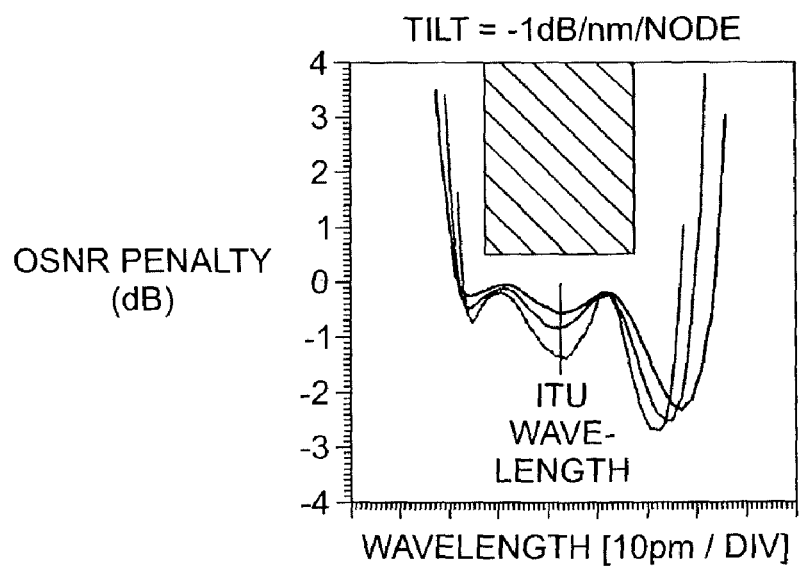

A calculation was performed comparing the transmission penalty with and without the provision of a fidelity-enhancing transmission slope, the results of which are illustrated in FIGS. 5(a) and 5(b). In FIGS. 5(a) and 5(b) the increase in the Optical Signal-To-Noise Ratio (OSNR) of the signal as a function of its wavelength excursion is shown for a signal that traverses a filter element with the transmission response shown in the insert superimposed on FIG. 5(a). The optical signal is adiabatically chirped with a main peak located at the wavelength denoted by the ITU wavelength. The shaded area in FIG. 5(a) shows a regime in which the OSNR penalty is more than 0.5 dB for a wavelength excursion from the main peak of 30 pm. No fidelity-enhancing transmission slope is applied in FIG. 5(a) and a fidelity-enhancing transmission slope of −1 dB/nm per node is applied in FIG. 5(b). The curves 500, 510, and 520 in FIGS. 5(a) and 5(b) show the results after the signal has traversed the filter element 4, 8, and 16 times, respectively. Even after traversing the filter element only four times the required OSNR increases by 0.5 dB within the 30 pm waveband when no fidelity-enhancing transmission slope is applied. The penalties increase as the signal traverses the filter element an increasing number of times and in this example reaches 1.0 dB and 1.9 dB for 8 and 16 passes through the filter, respectively. In contrast, there is no increase in the required OSNR when, as in FIG. 5(b), a fidelity-enhancing slope of −1 dB/nm per node is applied. In fact, for many wavelength excursions within the 30 pm waveband an improvement in the required OSNR is observed, which increases as the signal passes through the filter element an increasing number of times.

As the previous example illustrates, the present invention can significantly improve the fidelity of an optical signal having a high adiabatic chirp that is generated by a source such as a directly modulated laser. However, it is often the case that such a signal must co-exist with other signals that do not exhibit a high adiabatic chirp, such as those generated by sources employing Mach-Zehnder modulators or electro-absorption modulators, for example. For instance, a transmission system may support adiabatically chirped signals for OC-48 bit rates and non-adiabatically chirped signals for OC-192 or OC-768 bit rates. The non-adiabatically chirped signals will not experience the same improvements in fidelity that the present invention can achieve for adiabatically chirped signals. Of course, it is important that the non-adiabatically chirped signals do not undergo any significant penalties as a result of deliberately adding a fidelity-enhancing transmission slope. As discussed below with reference to FIG. 6, an optimum range exists over which adiabatically chirped signals may experience an improvement in fidelity while at the same time having a minimal impact on non-adiabatically chirped signals.

Figure 6:
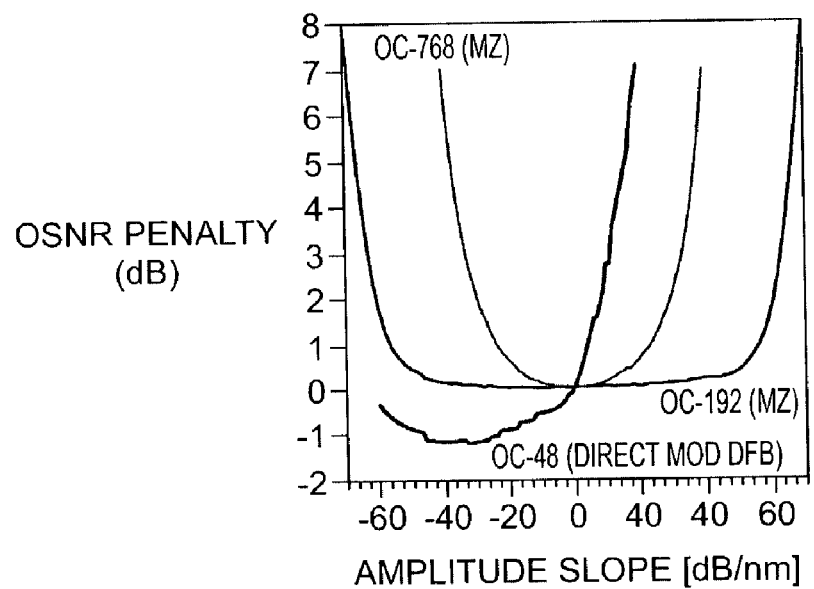
FIG. 6 shows the impact on the required OSNR of variously formatted signals as a function of the fidelity-enhancing transmission slope that is inserted into the system in accordance with the present invention.

FIG. 6 shows the impact on the required OSNR of variously formatted signals as a function of the fidelity-enhancing transmission slope that is inserted into the system in accordance with the present invention. In particular, FIG. 6 shows the OSNR penalty on adiabatically chirped signals at OC-48 bit rates and non-adiabatically chirped signals at OC-192 or OC-768 bit rates over an accumulated fidelity-enhancing transmission slope range of about +/−60 dB/nm. Clearly, the performance of the OC-48 signal is improved by introducing a fidelity-enhancing transmission slope and this improvement even extends beyond a fidelity-enhancing slope of −60 dB/nm. Moreover, any fidelity-enhancing slope having a value below zero yields an improvement in performance.

On the other hand, FIG. 6 also shows that the penalties to performance increase for both the OC-192 and OC-768 signals, with the penalty being greater in the latter case, as would be expected for the higher data rate signal. If a penalty of about 0.5 dB can be tolerated, the total fidelity-enhancing slope, which is limited by the OC-768 signals, can be as low as −19 dB/nm. For OC-192 the corresponding limit is about −52 dB/nm. However, even the more stringent limit of −19 dB/nm set by OC-768 allows a significant improvement in the performance of the OC-48 signals of about 1 dB.

The invention claimed is:

1. A method for reducing impairment to an adiabatically chirped optical signal having main and subsidiary peaks, the signal propagating in an optical communication system, said method comprising the steps of:
   receiving an adiabatically chirped optical signal that has traversed one or more network components in the optical communication system, said optical signal having a parameter characteristic of signal quality that is reduced at least in part by a-second transmission slope accumulated in the one or more network components, wherein the second transmission slope decreases the extinction ratio between the main and subsidiary peaks of the adiabatically chirped optical signal; and
   optically filtering with an optical filter having a first transmission slope at least one wavelength of the adiabatically chirped optical signal to impart the first transmission slope at one or more select points along a transmission path of the communication system so that the first transmission slope increases the extinction ratio between the main and subsidiary peaks of the adiabatically chirped optical signal, wherein the first transmission slope denotes a transmission response having a local maximum that is spectrally aligned with the main peak of the adiabatically chirped optical signal and a local minimum that is spectrally aligned with the subsidiary peak of the adiabatically chirped optical signal.

2. The method of claim 1 wherein said parameter characteristic of signal quality is an extinction ratio.

3. The method of claim 1 wherein the first transmission slope is at least substantially equal in magnitude to said total second transmission slope.

4. The method of claim 2 wherein the first transmission slope is at least substantially equal in magnitude to said total second transmission slope.

5. The method of claim 1 wherein the first transmission slope offsets said total second transmission slope by a prescribed amount.

6. The method of claim 5 wherein said prescribed amount is selected so that a non-adiabatically chirped signal traversing said one or more network components experiences a transmission penalty below a predetermined value.

7. The method of claim 1 further comprising the step of generating the adiabatically chirped signal by directly modulating an optical signal.

8. The method of claim 1 wherein at least one of said one or more network components includes an optical switch.

9. The method of claim 8 wherein said optical switch is a reconfigurable optical switch.

10. The method of claim 1 wherein said optical signal is a WDM optical signal.

11. The method of claim 10 wherein the step of imparting a first transmission slope includes the step of imparting a first transmission slope to a plurality of wavelengths in the WDM optical signal.

12. The method of claim 11 wherein said plurality of wavelengths is a subset of all wavelengths in the WDM optical signal.

13. A WDM optical communication system, comprising:
   a plurality of network components each having a characteristic transmission profile with an individual transmission slope experienced by an optical signal propagating therethrough, said optical signal having main and subsidiary peaks, at least one of said network components including an optical switch;
   at least one optical communication link interconnecting said network components;
   at least one filter element having a first transmission slope to at least partially offset a total second transmission slope experienced by the optical signal, said total second transmission slope being an accumulation of the individual transmission slopes of the network components, wherein the first slope increases the extinction ratio between the main and subsidiary peaks of the optical signal and the second slope decreases the extinction ratio between the two peaks of the optical signal, wherein the first transmission slope denotes a transmission response having a local maximum that is spectrally aligned with the main peak of the optical signal and a local minimum that is spectrally aligned with the subsidiary peak of the optical signal.

14. The system of claim 13 wherein the first transmission slope is at least substantially equal in magnitude to said total second transmission slope.

15. The system of claim 13 wherein said at least one filter element includes a plurality of filter elements having an accumulated first transmission slope at least partially offsetting said total second transmission slope.

16. The system of claim 15 wherein said accumulated first transmission slope is at least equal in magnitude to said total second transmission slope.

17. The system of claim 13 wherein the first transmission slope offsets said total second transmission slope by a prescribed amount.

18. The system of claim 17 wherein said prescribed amount is selected so that a non-adiabatically chirped signal traversing said plurality of network components experiences a transmission penalty below a predetermined value.

19. The system of claim 13 wherein said optical signal is an adiabatically chirped signal.

20. The system of claim 18 further comprising a data modulator directly modulating the optical signal to generate the adiabatically chirped optical signal.

21. The system of claim 13 wherein said optical switch is a reconfigurable optical switch.

22. The system of claim 13 wherein the plurality of network components includes a network node in which the optical switch is located.

23. The system of claim 13 wherein said plurality of network components are a plurality of network nodes arranged in a network configuration selected from the group consisting of a ring, mesh and point-to-point configuration.

24. The system of claim 13 wherein said at least one optical communication link includes a plurality of communication links, and said at least one filter element comprises a plurality of filter elements located in different ones of the optical communication links.

25. The system of claim 13 wherein said at least one filter element is a single filter element associated with a transmitter or receiver.

26. The system of claim 13 wherein said optical signal is a WDM optical signal.

27. The system of claim 26 wherein the at least one filter element imparts a first transmission slope to a plurality of wavelengths in the WDM optical signal.

28. The system of claim 27 said plurality of wavelengths is a subset of all wavelengths in the WDM optical signal.

* * * * *